(12) United States Patent
Koga et al.

(10) Patent No.: US 6,266,078 B1
(45) Date of Patent: Jul. 24, 2001

(54) IMAGE FORMING APPARATUS

(75) Inventors: Katsuhide Koga, Mishima; Tomobumi Nakayama, deceased, late of Tokyo, by Kazumi Nakayama, legal representative; Isamu Sato, Mishima; Tatsuhito Kataoka, Numazu; Yukio Yokoyama, Mishima; Takayuki Kawakami, Numazu, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/219,599

(22) Filed: Dec. 23, 1998

(30) Foreign Application Priority Data

Jan. 9, 1998 (JP) .................................................. 10-003377

(51) Int. Cl.$^7$ ..................................................... B41J 2/435
(52) U.S. Cl. ........................... 347/236; 347/246; 250/205
(58) Field of Search .................................. 347/236, 246, 347/257, 297, 259, 260, 243, 241; 250/204, 205; 257/98; 359/196, 198; 372/38

(56) References Cited

U.S. PATENT DOCUMENTS

| | | | |
|---|---|---|---|
| 4,788,560 | * 11/1988 | Miura | 347/236 |
| 5,731,831 | 3/1998 | Murabe et al. | 347/259 |
| 5,835,124 | 11/1998 | Fukita et al. | 347/260 |

* cited by examiner

*Primary Examiner*—N. Le
*Assistant Examiner*—Lamson D. Nguyen
(74) *Attorney, Agent, or Firm*—Fitzpatrick, Cella, Harper & Scinto

(57) ABSTRACT

An image forming apparatus, including a driving circuit for a multichip laser chip, which can limit or interrupt emission of laser light sources in accordance with a result of comparison of an optical output of each laser light source with a limiting value during time-division control is provided. The apparatus includes a plurality of laser light source, a light-amount control device for controlling an optical output of a laser beam from each of the plurality of laser light sources to a constant amount of light by performing time division processing, and a light detection device for detecting optical outputs of the plurality of laser light sources. The light detection device includes sensor units whose number is smaller than the number of the plurality of laser light sources. The apparatus also includes a limiting-value setting device for setting a limiting value for each optical output, a comparison device for comparing a time-division detection signal for a laser beam detected by the light detection device with the limiting value set by the limiting-value setting means during the time-division light-amount control by the light-amount control device, an emission control device for controlling emission of the plurality of laser light sources in accordance with an output signal from the comparison device, and a recording medium on which an image is formed by the plurality of laser beams.

31 Claims, 8 Drawing Sheets

IMAGE FORMING APPARATUS

BACKGROUND OF THE INVENTION

1. Field of the Invention

The present invention relates to an image forming apparatus for forming image information on an image bearing member using laser beams from a plurality of laser optical sources. More particularly, the invention relates to an image forming apparatus, such as a digital copier, a laser-beam printer, a facsimile apparatus or the like, in which laser beams subjected to optical modulation from a plurality of laser light sources are guided onto an image bearing member, such as a photosensitive member, an electrostatic recording medium or the like, and image information comprising, for example, an electrostatic latent image is formed on the surface of the image bearing member.

2. Description of the Related Art

Conventionally, in a laser driving circuit of image forming apparatuses of this type, in order to protect a laser from being destructed, the output of the laser beam is monitored, and the driving current for the laser is limited or interrupted when the output exceeds a specified value.

A specific control method in the above-described approach will now be described with reference to FIG. 1. FIG. 1 is a block diagram illustrating the configuration of a conventional 1-beam laser driving circuit. In FIG. 1, there are shown a laser chip 510, a laser 511, a PD (photodiode) sensor 513, a pulse current source 521, a bias current source 523, a switch 531 for a pulse, a switch 533 for the laser, a PWM (pulse-width modulation) circuit 535, a current-to-voltage converter 541, an amplifier 542, a sequence controller 543, a comparator 545 and an APC (automatic power control) circuit 550.

Conventionally, in an image forming apparatus of this type, as shown in FIG. 1, the laser chip 510 comprising the single laser 511 and the PD sensor 513 is used. By using the two current sources, i.e., the bias current source 523 and the pulse current source 521, for the laser 511, the emission characteristics of the laser 511 are improved. In order to stabilize the emission of the laser 511, the amount of a bias current is automatically controlled by effecting feed-back to the bias current source 523 using an output signal from the PD sensor 513. That is, the output signal from the PD sensor 513 is input to the current-to-voltage converter 541, and is then amplified by the amplifier 542. The output of the amplifier 542 is input to the APC circuit 550, and is then supplied to the bias current source 523 as a control signal. This circuitry is called APC circuitry, which is now generally used as circuitry for driving a laser. The laser has a temperature characteristic such that as the temperature is higher, the amount of current for obtaining a constant amount of light is larger. In addition, since the laser performs self-heating, a constant amount of light cannot be obtained only by supplying a constant current. This phenomenon greatly influences image formation. In order to solve such a problem, the above-described APC circuirtry has been devised. By adopting this circuitry, it is possible to obtain a constant amount of light without being influenced by the ambient temperature of the laser, and to inexpensively realize appropriate image formation. The output of the PD sensor 513 is used not only for stabilizing the output of the laser, but also for protecting the laser from being destructed. The laser is very easily destructed. If the laser is used in a condition slightly exceeding a rating, it will be degraded or destructed in a short time. In a circuit for protecting the laser, a limiting value LIM which is slightly larger than a reference value for an optical output usually used in image formation is set. As shown in FIG. 1, the output of the PD sensor 513 is compared with the limiting value LIM using the comparator 545. When the output of the PD sensor 513 exceeds the limiting value LIM, a warning signal indicating abnormal emission is output. While the warning signal is output, current supply to the laser is limited or interrupted using the switch 533 for the laser comprising a transistor switch or the like.

In digital image forming apparatuses, there is a strong demand to increase an image forming speed. In order to reply to such a demand, image forming apparatuses in which a laser driving circuit using a multiple lasers is provided have been proposed. The above-described protection circuit is also indespensable in such an apparatus, and it is requested to protect degradation or destruction of a plurality of lasers. In this case, a configuration as shown in FIG. 2 which is similar to the configuration shown in FIG. 1 is used.

FIG. 2 is a block diagram illustrating the configuration of a conventional twin-beam laser driving circuit. In FIG. 2, there are shown a multilaser chip 610, an A laser 611, a B laser 612, a PD sensor 613, an A pulse current source 621, a B pulse current source 622, an A bias current source 623, a B bias current source 625, a switch 631 for an A pulse, a switch 632 for a B pulse, a switch 633 for the A laser, a switch 634 for the B laser, a PWM circuit 635 for the A laser, a PWM circuit 636 for the B laser, a current-to-voltage converter 641, an amplifier 642, a sequence controller 643, a comparator 645, and a time-division APC circuit 650.

In FIG. 2, the switch 631 for the A pulse and the switch 632 for the B pulse switch on/off the A pulse current source 621 and the B pulse current source 622 in accordance with an output signal from the PWM circuit 635 for the A laser and an output signal from the output from the PWM circuit 636 for the B laser, respectively; The amplifier 642 amplifies the output of the PD sensor 613 converted into a voltage by the current-to-voltage converter 641. The comparator 645 compares the output of the PD sensor 613 converted into the voltage and amplified by the amplifier 642 with the limiting value LIM for the optical output, and outputs a warning signal indicating abnormal emission when the output of the PD sensor 613 exceeds the limiting value LIM. While the warning signal is output, current supply to the A laser 611 and the B laser 612 is limited or interrupted using the switch 633 for the A laser and the switch 634 for the B laser, each comprising a transistor switch or the like, respectively.

However, in a multilaser configuration in which a plurality of lasers are provided in a chip, a single PD sensor is provided commonly for the plurality of lasers because of restriction in the configuration of the chip. Hence, in the above-described conventional protection circuit, only the sum of optical detection signals for the plurality of lasers is known when, for example, both the A laser and the B laser are simultaneously lit. As a result, even if the optical output of one laser exceeds the limiting value, current supply for that laser is not limited or interrupted unless the sum of the optical outputs of the lasers exceeds the sum of the limiting values. Furthermore, it is impossible to specify the laser which is degraded or destructed.

SUMMARY OF THE INVENTION

It is an object of the present invention to provide an image forming apparatus which includes a driving circuit for a multilaser chip having a plurality of laser light sources and which can limit or interrupt the emission of the laser light sources based on a result of comparison of the detected optical output for each the laser light source with a corresponding limiting value during time-division control.

According to one aspect, the present invention relates to an image forming apparatus including a plurality of laser light sources, light-amount control means for controlling an optical output of a laser beam from each of the plurality of laser light sources to a constant amount of light by performing time division processing, and light detection means for detecting optical outputs of the plurality of laser light sources. The light detection means includes sensor units whose number is smaller than the number of the plurality of laser light sources. The image forming apparatus also includes limiting-value setting means for setting a limiting value for each optical output, comparison means for comparing a time-division detection signal for a laser beam detected by the light detection means with the limiting value set by the limiting-value setting means during the time-division light-amount control by the light-amount control means, emission control means for controlling emission of the plurality of laser light sources in accordance with an output signal from the comparison means, and a recording medium on which an image is formed by the plurality of laser beams.

According to another aspect, the present invention relates to a laser driving circuit including a plurality of laser light sources, light-amount control means for controlling an optical output of a laser beam from each of the plurality of laser light sources to a constant amount of light by performing time division processing, and light detection means for detecting optical outputs of the plurality of laser light sources. The light detection means includes sensor units whose number is smaller than the number of the plurality of laser light sources. The image forming apparatus also includes limiting-value setting means for setting a limiting value for each optical output, comparison means for comparing a time-division detection signal for a laser beam detected by the light detection means with the limiting value set by the limiting-value setting means during the time-division light-amount control by the light-amount control means, and emission control means for controlling emission of the plurality of laser light sources in accordance with an output signal from the comparison means.

The image forming apparatus or the laser driving circuit may also include warning means for generating a warning signal in accordance with the output signal from the comparison means. The detection signal for the laser beam detected by the light detection means during the time-division light-amount control by the light-amount control means may be a detection signal for an optical output during a full lighting period.

The light-amount control means may include a pulse current source subjected to on/off control by pulse-generation control means, and a bias current source whose output is applied to the plurality of laser light sources in parallel with the pulse current source and is adjustable. The bias current source may include a first bias current source and a second bias current source. The second bias current source may be subjected to on/off control by the pulse-generation control means.

According to still another aspect, the present invention relates to an image forming apparatus including a plurality of laser light sources, light-amount control means for controlling an optical output of a laser beam from each of the plurality of laser light sources to a constant amount of light by performing time division processing, and light detection means for detecting optical outputs of the plurality of laser light sources. The light detection means includes sensor units whose number is smaller than the number of the plurality of laser light sources. The image forming apparatus also includes first limiting-value setting means for setting a first limiting value for an optical output of a laser beam, second limiting-value setting means for setting a second limiting value for an optical output of a laser beam, first comparison means for comparing a first detection signal for a laser beam detected by the light detection means with the first limiting value set by the first limiting-value setting means during the time-division light-amount control by the light-amount control means, second comparison means for comparing a second detection signal for a laser beam detected by the light detection means with the second limiting value set by the second limiting-value setting means during the time-division light-amount control by the light-amount control means, emission control means for controlling emission of the plurality of laser light sources in accordance with output signals from the first comparison means and the second comparison means, and a recording medium on which an image is formed by the plurality of laser beams.

According to yet another aspect, the present invention relates to a laser driving circuit including a plurality of laser light sources, light-amount control means for controlling an optical output of a laser beam from each of the plurality of laser light sources to a constant amount of light by performing time division processing, and light detection means for detecting optical outputs of the plurality of laser light sources. The light detection means includes sensor units whose number is smaller than the number of the plurality of laser light sources. The image forming apparatus also includes first limiting-value setting means for setting a first limiting value for an optical output of a laser beam, second limiting-value setting means for setting a second limiting value for an optical output of a laser beam, first comparison means for comparing a first detection signal for a laser beam detected by the light detection means with the first limiting value set by the first limiting-value setting means during the time-division light-amount control by the light-amount control means, second comparison means for comparing a second detection signal for a laser beam detected by the light detection means with the second limiting value set by the second limiting-value setting means during the time-division light-amount control by the light-amount control means, and emission control means for controlling emission of the plurality of laser light sources in accordance with output signals from the first comparison means and the second comparison means.

The first detection signal for the laser beam detected by the light detection means may be a detection signal for an optical output during a full lighting period, and the second detection signal for the laser beam detected by the light detection means may be a detection signal for an optical output during a bias lighting period.

The image forming means may also include warning means for generating a warning signal in accordance with output signals from the first comparison means and the second comparison means. The emission control means may interrupt emission of at least one laser light source from among the plurality of laser light sources in accordance with an output signal from comparison means selected from the first comparison means and the second comparison means, or in accordance with an output from the first comparison means.

The light-amount control means may include a pulse current source subjected to on/off control by pulse-generation control means, and a bias current source whose output is applied to the plurality of laser light sources in parallel with the pulse current source and is adjustable. The bias current source may include a first bias current source and a second bias current source. The second bias current source may be subjected to on/off control by the pulse-generation control means.

According to yet a further aspect, the present invention relates to a method for controlling emission of a plurality of laser light sources, including the steps of setting a limiting value for an optical output of a laser beam, comparing a first time-division detection signal for a first laser beam detected by light detection means with the limiting value by comparison means during time-division light-amount control for the first laser beam, comparing a second time-division detection signal for a second laser beam detected by the light detection means with the limiting value by the comparison means during time-division light-amount control for the second laser beam, and controlling emission of the first laser light source and the second laser light source in accordance with output signals from the comparison means.

By providing the respective means having the above-described functions, only a time-division output signal output during time-division control for each laser to be subjected to APC control is monitored, instead of always monitoring an optical detection signal from a PD sensor as in the conventional approach. Such processing is indispensable in detection of the light amount of each laser beam. After detecting the time-division optical signal, a constant amount of light is obtained because an APC control operation is performed, so that it is unnecessary to perform monitoring. According to the above-described configuration, it is possible to determine whether or not the optical output of each laser exceeds a preset limiting value, and to perform a protection operation in which the driving of the laser is llimited or interrupted in accordance with the result of the determination.

As will be shown in the following description of the preferred embodiments, by providing the respective means having the above-described functions, it is possible to prevent degradation or destruction of a laser due to abnormal emission, and generation of a fog during bias lighting due to an abnormal increase in the bias current caused by a temperature rise or the like.

The foregoing and other objects, advantages and features of the present invention will become more apparent from the following description of the preferred embodiments taken in conjunction with the accompanying drawings.

DESCRIPTION OF THE PREFERRED EMBODIMENTS

An image forming apparatus according to the present invention will now be described with reference to the drawings.

Figure 3:
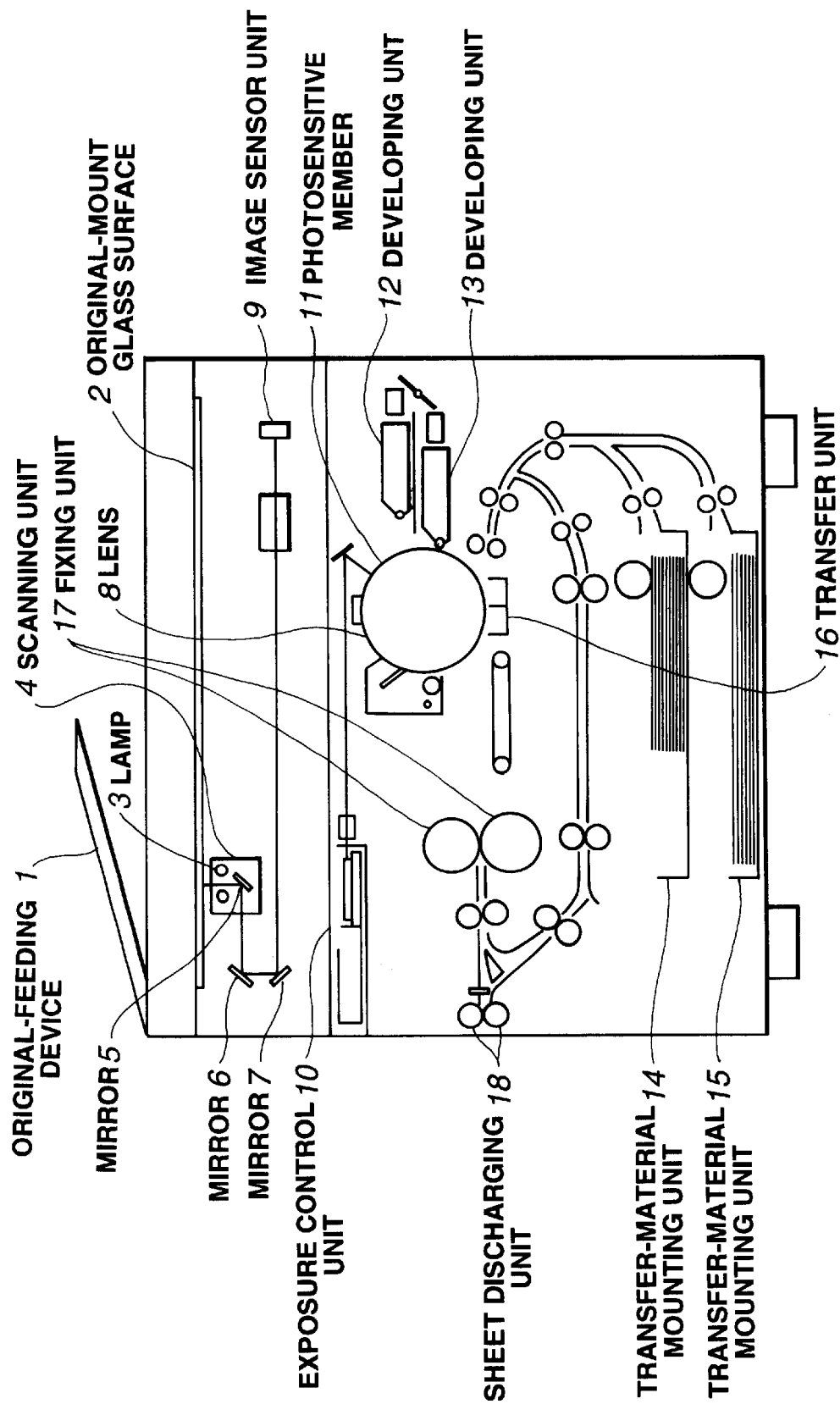
FIG. 3 is a cross-sectional view illustrating an image processing apparatus including a laser driving circuit according to the present invention.

FIG. 3 is a cross-sectional view illustrating an image forming apparatus including a laser driving circuit according to the present invention. In FIG. 3, there are shown an original-feeding device 1, an original-mount glass surface 2, a lamp 3, a scanner unit 4, mirrors 5, 6 and 7, a lens 8, an image sensor unit 9, an exposure control unit 10, a photosensitive member 12, a developing unit 13, transfer-material mounting units 14 and 15, a transfer unit 16, a fixing unit 17, and a sheet discharging unit 18.

The basic operation of the image forming apparatus will now be described with reference to FIG. 3. Originals mounted on the original-feeding device 1 are individually conveyed onto the original-mount glass surface 2. When an original has been conveyed, the lamp 3 of the scanner unit 4 is lit, and the scanner unit 4 moves to illuminate the original. Light reflected from the original passes through the lens 8 via the mirrors 5, 6 and 7, and is then incident upon the image sensor unit 9. An image signal obtained from the image sensor unit 9 is first stored in an image memory (not shown), and is then read and input to the exposure control unit 10. A latent image is formed on the photosensitive member 11, serving as a recording medium, by illuminating light generated by the exposure control unit 10. The formed latent image is developed by the developing unit 12 or 13, to provide a toner image. A transfer material is conveyed from the transfer-material mounting unit 14 or 15 in synchronization with the movement of the toner image, and the toner image on the photosensitive member 11 is transferred onto the transfer material at the transfer unit 16. The transferred toner image is fixed at the fixing unit 17, and the transfer material having the toner image transferred thereto is discharged to the outside of the apparatus.

Figure 4:
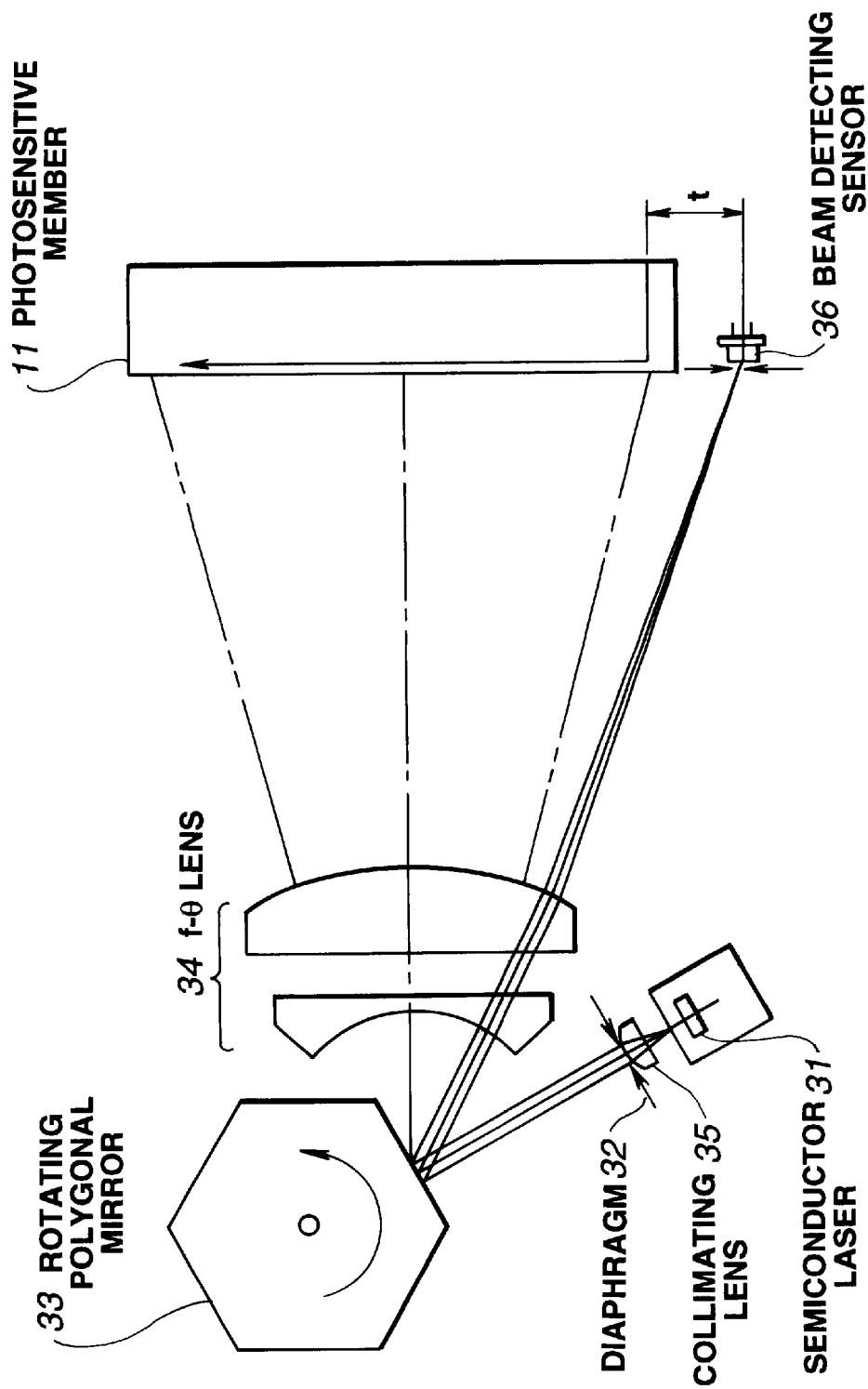
FIG. 4 is a schematic diagram illustrating the configuration of an exposure control unit of the image forming apparatus shown in FIG. 3.

FIG. 4 is a schematic diagram illustrating the configuration of the exposure control unit 10 of the image forming apparatus shown in FIG. 3. In FIG. 4, there are shown the photosensitive member 11, a semiconductor laser 31, a diaphragm 32, a rotating polygonal mirror 33, an f-θ lens 34, a collimating lens 35, and a beam detecting sensor 36.

In FIG. 4, a PD sensor for detecting a part of a laser beam is provided within the semiconductor laser 31, and APC control for the laser diode is performed using a detection signal from the PD sensor. The laser beam emitted from the semiconductor laser 31 becomes a substantially parallel beam by the collimating lens 35 and the diaphragm 32, and is incident upon the rotating polygonal mirror 33 with a predetermined beam diameter. The rotating polygonal mirror 33 rotates at a constant angular velocity in the direction of the arrow. The incident laser beam is reflected in accordance with the rotation of the rotating polygonal mirror 33 as a deflecting beam which continuously changes its angle. The deflected beam is condensed by the f-θ lens 34. Since the f-θ lens 34 also corrects distortion aberration so as to guarantee temporal linearity of scanning, the laser beam scans the surface of the photosensitive member 11, serving as the recording medium, in the direction of the arrow at a constant velocity. The beam detecting (hereinafter abbreviated as "BD") sensor 36 detects the reflected light from the rotating polygonal mirror 33. A detection signal from the BD sensor 36 is used as a synchronizing signal for obtaining synchronism between the rotation of the rotating polygonal mirror 33 and data writing.

Figure 1:
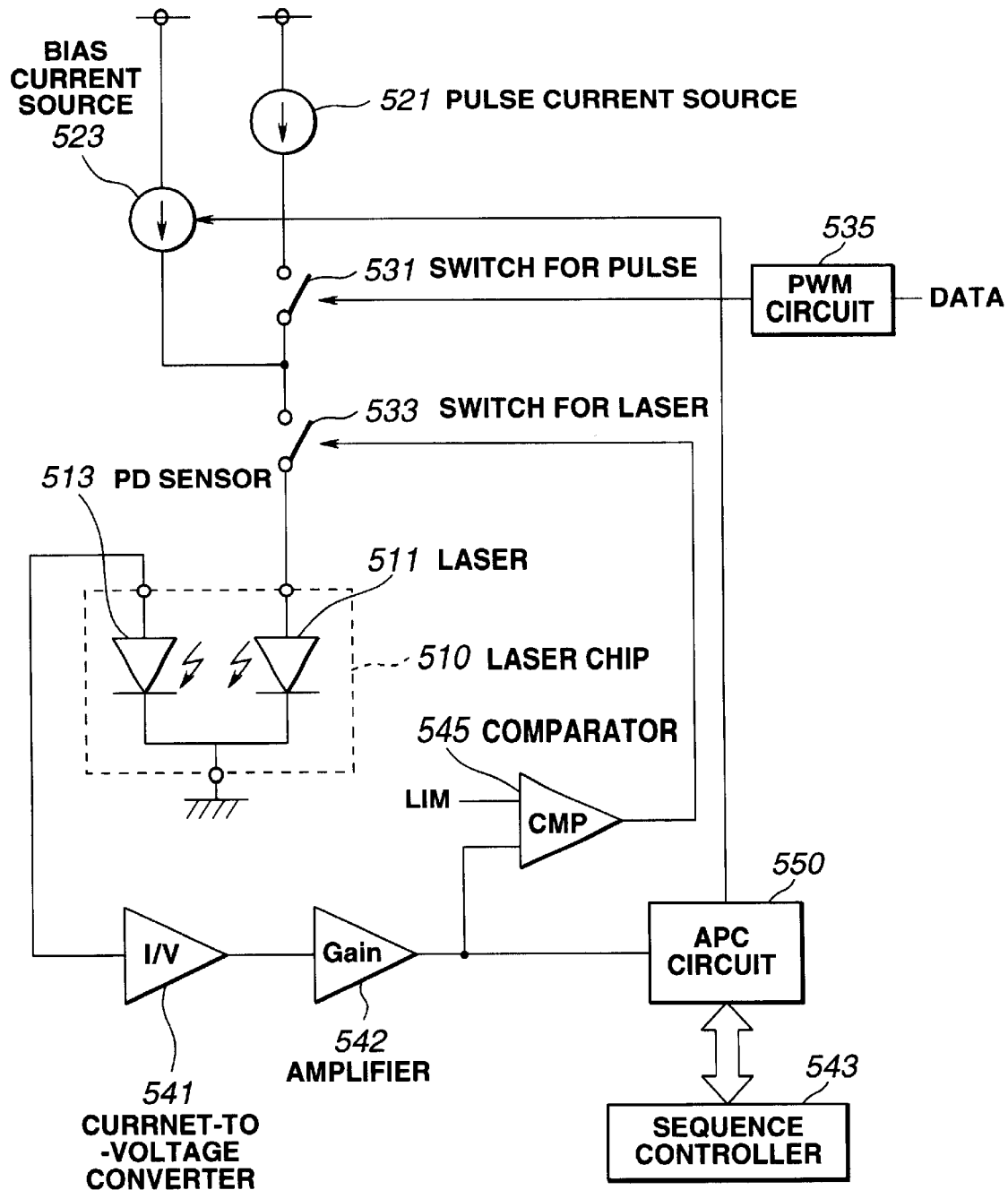
FIG. 1 is a block diagram illustrating the configuration a conventional 1-beam laser driving circuit.
Figure 2:
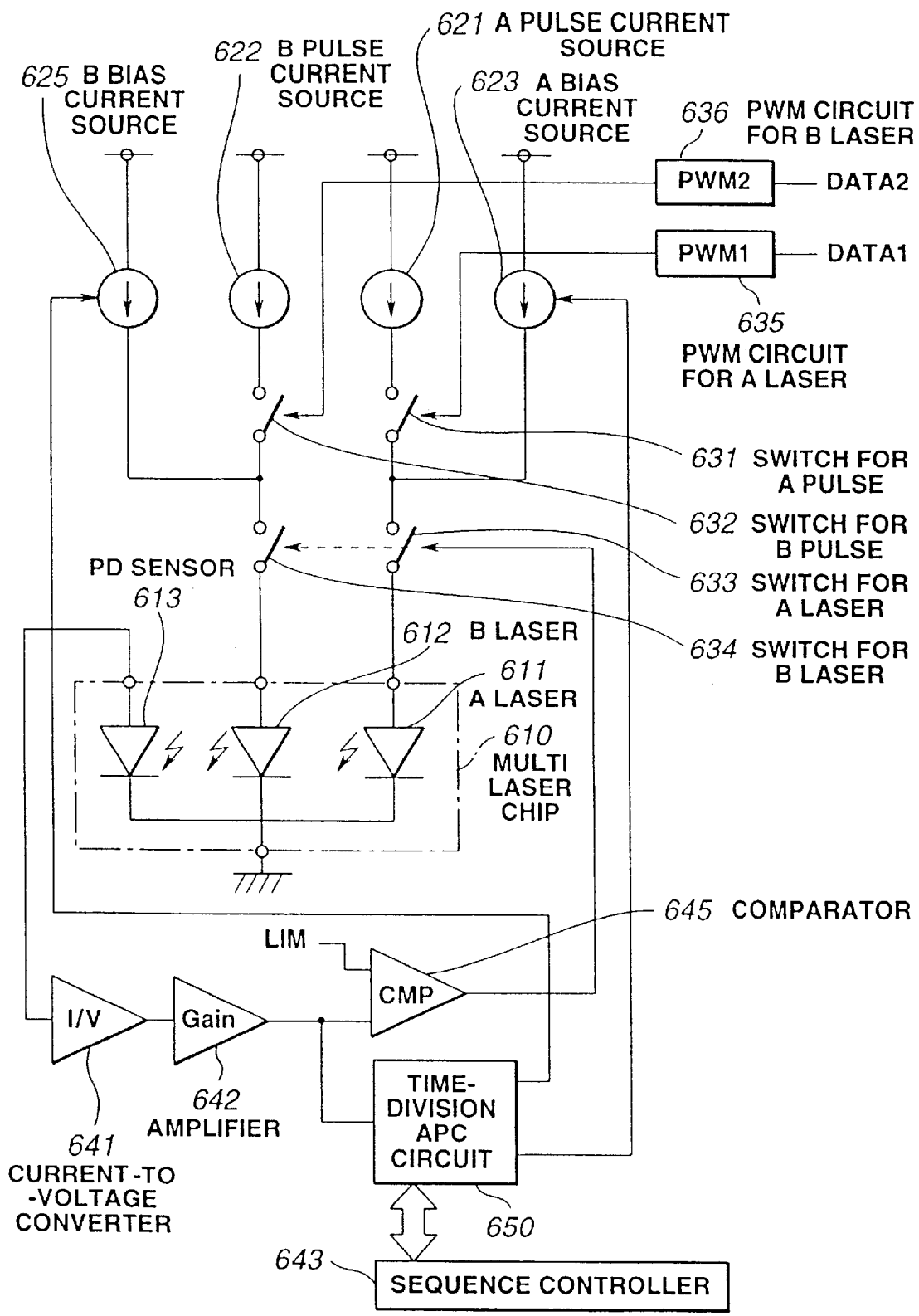
FIG. 2 is a block diagram illustrating the configuration of a conventional twin-beam laser driving circuit.

Next, a method for controlling a laser driving circuit including a protection circuit according to a first embodiment of the present invention will be described in detail with reference to FIGS. 5 and 6. As light-amount control means for the laser driving circuit, a pulse current source subjected to on/off control by pulse-generation control means, such as the PWM circuit shown in FIG. 1 or 2, or the like, and a first bias current source whose output is applied to a laser light source in parallel with the pulse current source and is adjustable have been used. However, since the upper limit of the output of the first bias current source is restricted in order to prevent a fog during bias lighting, a method of also using a second bias current source whose output is adjustable and which is subjected to on/off control simultaneously with the pulse current source by the pulse-generation control means tends to be adopted.

Although the present invention may be applied to any method, in the first embodiment, a description will be provided illustrating a laser driving circuit including light-amount control means which combines a pulse current source subjected to on/off control by pulse-generation control means, a first bias current source whose output is applied to a laser light source in parallel with the pulse current source and is adjustable, and a second bias current source which is subjected to on/off control by the pulse-generation control means and whose output is applied to the laser light source in parallel with the pulse current source and is adjustable.

Figure 5:
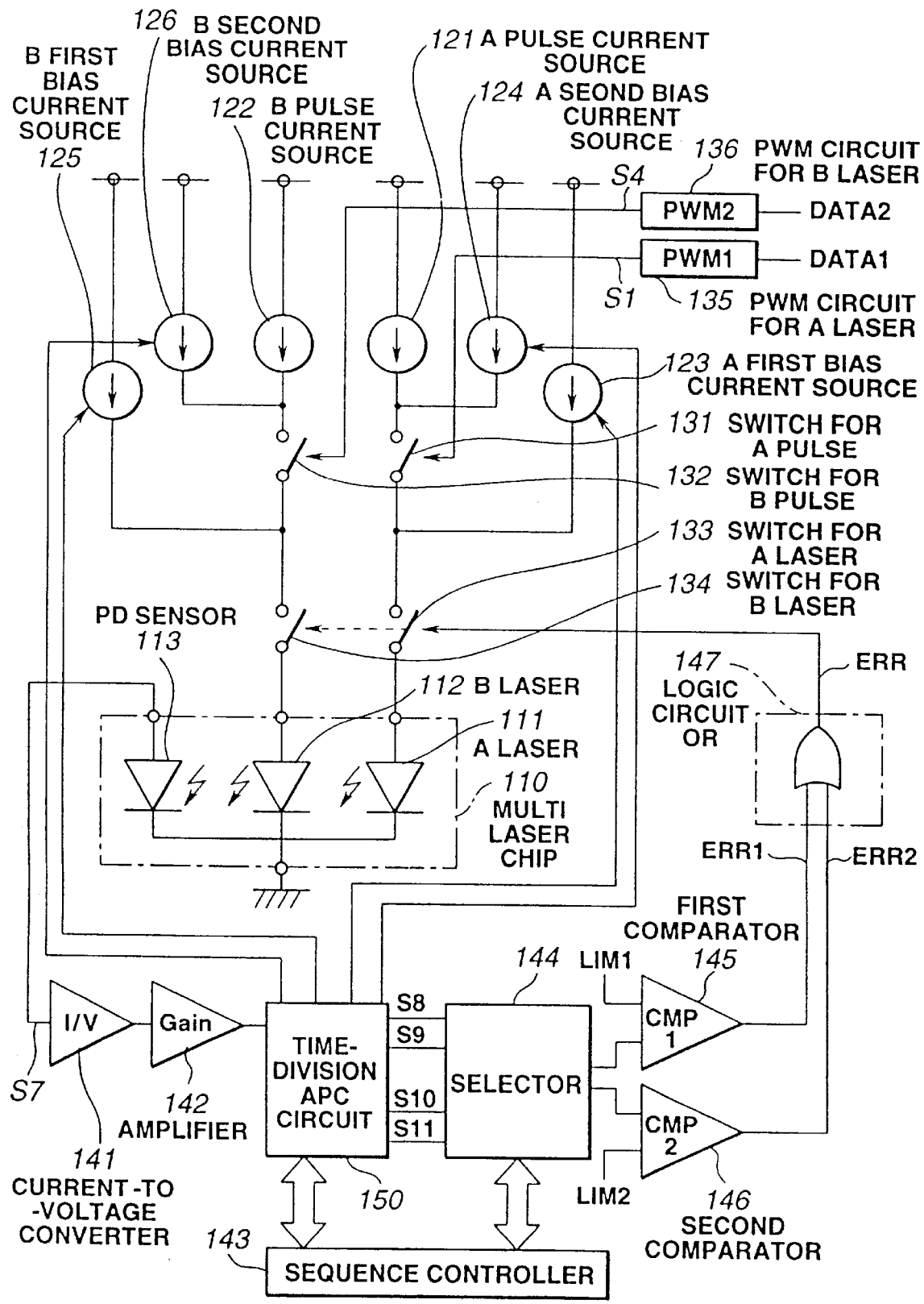
FIG. 5 is a block diagram illustrating the configuration of a laser driving circuit according to a first embodiment of the present invention.

FIG. 5 is a block diagram illustrating the configuration of the laser driving circuit according to the first embodiment. In FIG. 5, there are shown a multilaser chip 110, an A laser 111, a B laser 112, a PD sensor 113, an A pulse current source 121, a B pulse current source 122, an A first bias current source 123, an A second bias current source 124, a B first bias current source 125, a B second bias current source 126, a switch 131 for an A pulse, a switch 132 for a B pulse, a switch 133 for the A laser, a switch 134 for the B laser, a PWM circuit 135 for the A laser, a PWM circuit 136 for the B laser, a current-to-voltage converter 141, an amplifier 142, a sequence controller 143, a selector 144, a first comparator 145, a second comparator 146, a logic circuit OR 147, and a time-division APC circuit 150.

In FIG. 5, the multilaser chip 110 indicates the internal configuration of the semiconductor laser 31 shown in FIG. 4, and is a twin laser comprising the A laser 111, the B laser 112 and the PD sensor 113. The A pulse current source 121 is a pulse current source for the A laser 111.

The A first bias current source 123 is a bias current source always applied to the A laser 111. The A second bias current source 124 is a bias current source applied to the A laser 111 simultaneously with the A pulse current source 121. The B pulse current source 122 is a pulse current source for the B laser 112. The B first bias current source 125 is a bias current source always applied to the B laser 112. The B second bias current source 126 is a bias current source applied to the B laser 112 simultaneously with the B pulse current source 122. An image signal DATAL is subjected to pulse-width modulation by the PWM circuit 135 for the A laser. The emission of the A laser 111 is controlled by the switch 131 for the A pulse subjected to on/off control by an output signal S1 from the PWM circuit 135. Similarly, an image signal DATA2 is subjected to pulse-width modulation by the PWM circuit 136 for the B laser. The emission of the B laser 112 is controlled by the switch 132 for the B pulse subjected to on/off control by an output signal S4 from the PWM circuit 136. An output signal S7 from the PD sensor 113 is converted into a voltage signal by the current-to-voltage (I/V) converter 141. The obtained voltage signal is amplified by the amplifier 142 and is input to the time-division APC circuit 150.

Figure 6:
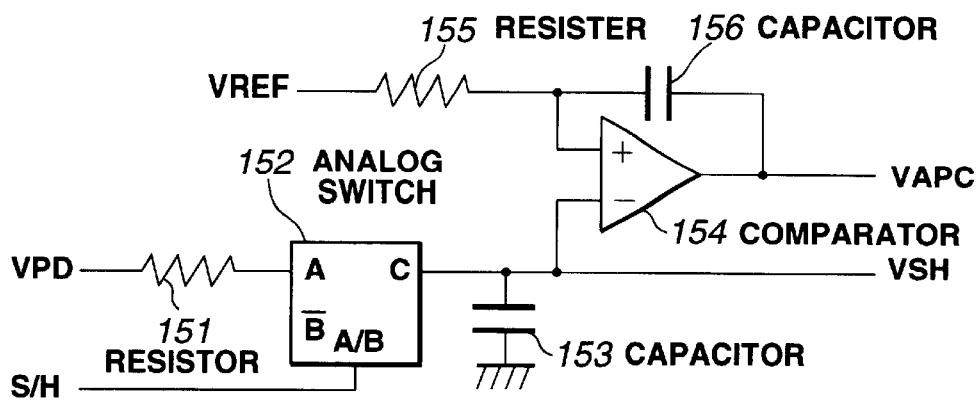
FIG. 6 is a block diagram illustrating the configuration of one of four identical circuits incorporated in a time-division APC circuit shown in FIG. 5.
Figure 7:
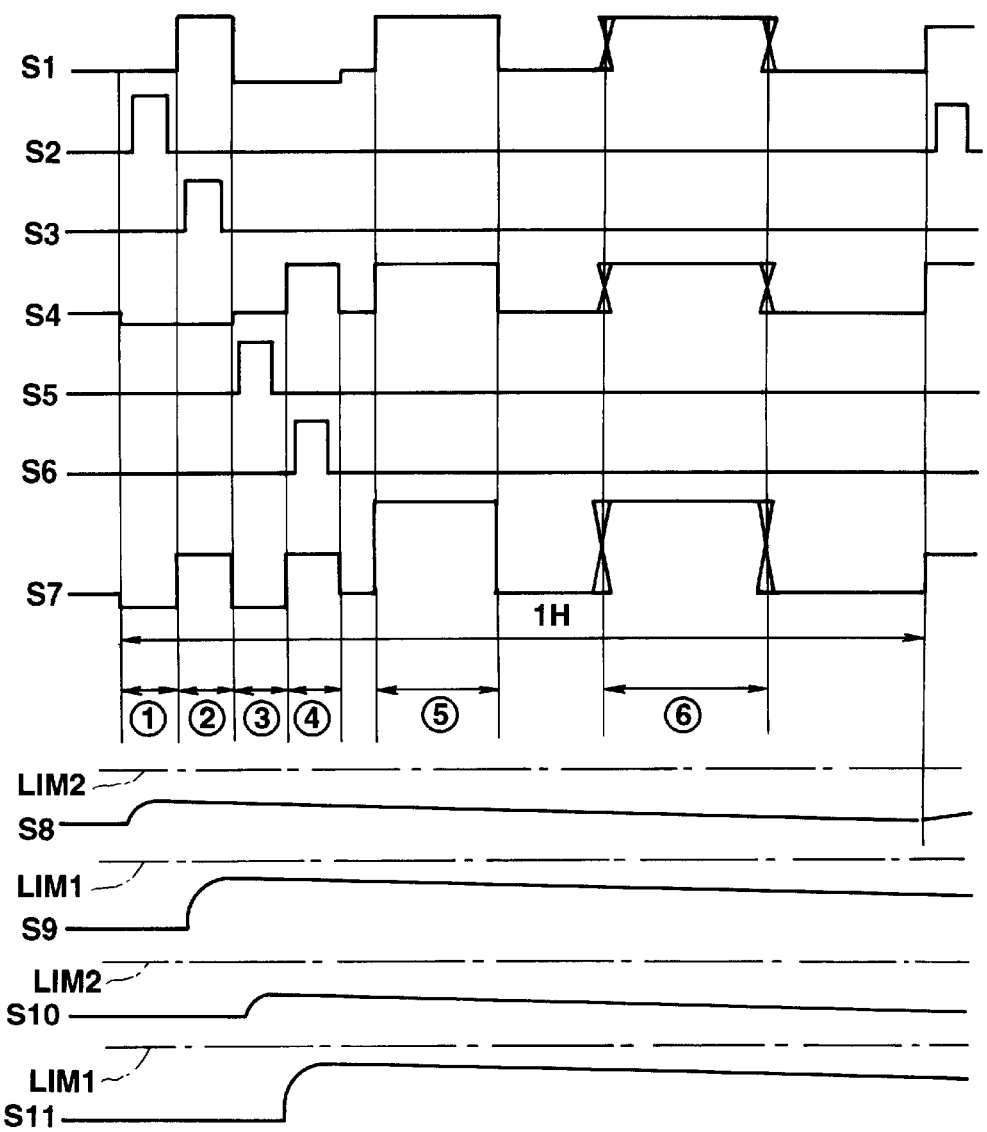
FIG. 7 is a timing chart for the laser driving circuit and a protection circuit in the first embodiment.

FIG. 6 is a block diagram illustrating one of four identical circuits incorporated in the time-division APC circuit 150 shown in FIG. 5. In FIG. 6, there are shown resistors 151 and 155, an analog switch 152, capacitors 153 and 156, and a comparator 154. FIG. 7 is a timing chart for the laser driving circuit and the protection circuit in the first embodiment. In FIG. 7, there are shown an output signal S1 from the PWM circuit 135 for the A laser, a sample-and-hold signal (hereinafter abbreviated as an S/H signal) S2 from the sequence controller 143 during bias lighting of the A laser, an S/H signal S3 from the sequence controller 143 during full lighting of the A laser, an output signal S4 from the PWM circuit 136 for the B laser, an S/H signal S5 from the sequence controller 143 during bias lighting of the B laser, an S/H signal S6 from the sequence controller 143 during full lighting of the B laser, an output signal S7 from the PD sensor 113, and VSH output signals S8, S9, S10 and S11 from respective circuits of the time-division APC circuit 150 during bias lighting of the A laser, during full lighting of the A laser, during bias lighting of the B laser, and during full lighting of the B laser, respectively. These signals are also shown in FIG. 5.

In FIG. 7, symbol 1H represents one scanning period of the laser beam, numerals ①–④ represent detection periods for the respective lasers during full lighting and during bias lighting, numeral ⑤ represents a BD detection period, and numeral ⑥ represents an actual image forming period. These periods are controlled by the sequence controller 143.

The time-division APC circuit 150 incorporates, for example, four identical circuits as the one shown in FIG. 6. In the time-division APC circuit 150, an input signal VPD obtained by amplifying the PD sensor output signal S7 is sampled with an S/H signal, which is a time-serial signal from the sequence controller 143, using the analog switch 152, and the voltage value VSH of the resultant signal is held during one scanning period (the period 1H shown in FIG. 7) with a time constant determined by the resistor 151 and the capacitor 153. Then, a difference signal VAPC obtained by comparing the voltage value VSH with a preset reference voltage VREF is output. Respective currents for the A first bias current source 123, the A second bias current source 124, the B first bias current source 125, and the B second bias current source 126 are controlled in accordance with the difference signal VAPC. That is, by controlling the current of each bias current source so as to provide a target amount of light represented by the reference voltage VREF, APC control is performed in order to provide a desired amount of light of the corresponding semiconductor laser.

Such control will now be described with reference to the timing chart shown in FIG. 7. By performing time-division control of the A first bias current source 123, the A second bias current source 124, the B first bias current source 125, and the B second bias current source 126 during bias lighting of the A laser (the period S7 ① with the S/H signal S2), during full lighting of the A laser (the period S7 ② with the S/H signal S3), during bias lighting of the B laser (the period S7 ③ with the S/H signal S5), and during full lighting of the B laser (the period S7 ④ with the S/H signal S6), respectively, it is possible to very precisely maintain the amount of emission of each laser to a constant value. That is, for each of the A laser and the B laser, first, the first bias current source is controlled by the reference voltage VREF representing the optical output during predetermined bias lighting, and then, the second bias current source is controlled so that the optical output during full lighting has a value represented by the reference voltage VREF representing the optical output during predetermined full lighting. In the periods S7 ① and S7 ② the bias current for the B laser is not supplied, and in the periods S7 ③ and S7 ④ the bias current for the A laser is not supplied.

Each of the time-division VSH signals (S8, S9, S10 and S11 shown in FIG. 7) output from the time-division APC circuit 150 is output to the selector 144 comprising an analog switch or the like. A-side signals (S8 and S9 shown in FIG. 7) and B-side signals (S10 and S11 shown in FIG. 7) are selected by the selector 144 during APC control of the A laser 111 and during APC control of the B laser 112, respectively. A corresponding output signal (S9 or S11 shown in FIG. 7) from the selector 144 is selectively input to the first comparator 145 when the timing during APC control is full lighting, and a corresponding output (S8 or S10 shown in FIG. 7) from the selector 144 is selectively input to the second comparator 146 when the timing during APC control is bias lighting, and the respective input signals are compared with preset limiting values LIM1 and LIM2. The values LIM1 and LIM2 are limiting voltage values for protecting the lasers which have been set in advance using a VR (variable resistor) or the like (not shown). The value LIM1 is set to be larger than the reference voltage value VREF set for APC control during full lighting, and the value LIM2 is set to be larger than the reference voltage value VREF' set for APC control during bias lighting. When the output signal from the selector 144 does not exceed the values LIM1 and LIM2 as S8–S11 shown in FIG. 7, both the A laser 111 and B laser 112 shift to a sequence for detection by the BD sensor 36 (the period S7 ⑤ shown in FIG. 7), and then to an image forming region (the period S7 ⑥ shown in FIG. 7). When some VSH signal exceeds the limiting value LIM1 or LIM2 during the period S7 ①–④ shown in FIG. 7, an error signal ERR1 or ERR2 is output from the first comparator 145 or the second comparator 146, respectively. These two error signals are input to the logic circuit OR 147, which generates an error signal ERR. The A laser 111 and the B laser 112 are turned off by disconnecting the switch 133 for the A laser and the switch 134 for the B laser, respectively, by the error signal ERR, to stop the sequence. At the same time, an error flag is provided by the error signals ERR1 and ERR2, or the error signal ERR, to cause an operation unit or the like (not shown) to perform error display.

As described in the first embodiment, when the VSH signal during full lighting exceeds the limiting value LIM1, the emission of the laser is instantaneously interrupted. Hence, degradation or destruction of the laser can be prevented. Furthermore, when the VSH signal during full lighting does not exceed the limiting value LIM1 but the VSH signal during bias lighting exceeds the limiting value LIM2, the emission of the laser is also instantaneously interrupted. Hence, it is possible to not only prevent destruction of the laser, but also a fog in an output image due to an increase in the bias current caused by temperature rise or the like.

Although in the first embodiment, the case that the second bias current source is provided has been described, the present invention may also be applied to a case in which the second bias current source is not provided. In such a case, control for the bias current source is not performed during bias lighting. During full lighting, the bias current source is controlled so that the optical output during full lighting has a value represented by the reference voltage VREF during full lighting, and it is monitored if the VSH signal during full lighting exceeds the limiting value LIM1. In this case, control to make the optical output during bias lighting to have a value represented by the reference voltage VREF is not performed. Hence, the probability that the optical output during bias lighting exceeds the limiting value LIM2 is larger than in the first embodiment.

Monitoring if the VSH signal during bias lighting exceeds the limiting value LIM2 may be omitted if it is unnecessary to prevent a fog in an output image due to an increase in the bias current. Even if this monitoring is omitted, it is possible to detect when the optical output of each laser exceeds the limiting value instead of detecting the sum of optical detection signals of a plurality of lasers, and therefore to assuredly prevent degradation or destruction of the laser.

Although in the first embodiment, the emission of the laser is instantaneously interrupted when the optical output during bias lighting and full lighting exceeds the limiting value, the emission of the laser may be limited instead of interrupting.

Although in the first embodiment, a twin-beam laser driving circuit has been illustrated, the present invention may, of course, be easily applied to a multibeam system having at least three beams.

Figure 8:
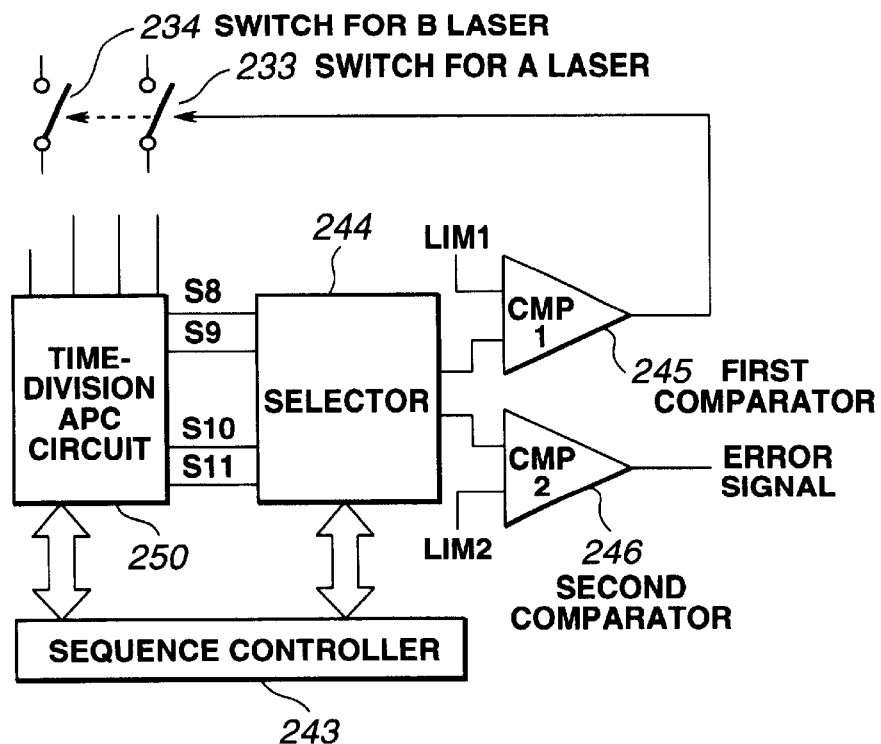
FIG. 8 is a block diagram illustrating the configuration of a portion including a laser driving circuit and a protection circuit according to a second embodiment of the present invention.

Next, a second embodiment of the present invention will be described with reference to FIG. 8. FIG. 8 is a block diagram illustrating the configuration of a portion including a laser driving circuit and a protection circuit according to the second embodiment. In FIG. 8, there are shown a switch 233 for an A laser, a switch 234 for a B laser, a sequence controller 243, a selector 244, a first comparator 245, a second comparator 246, and a time-division APC circuit 250.

In the second embodiment, only portions different from the first embodiment will be described. In the second embodiment, the logic circuit OR 147 in the first embodiment is not used, and the output of the first comparator 245 is directly used as a signal for disconnecting the switch 233 for the A laser and the switch 234 for the B laser. That is, when the VSH signal during full lighting exceeds the limiting value LIM1, the emission of the laser is instantaneously interrupted because the laser may be degraded or destructed. However, if the signal during full lighting does not exceeds the limiting value LIM1 when the signal during bias lighting exceeds the limiting value LIM2, the laser is not instantaneously interrupted because there is little possibility of degradation or destruction of the laser, and only an error signal is output from the second comparator 246.

Figure 9:
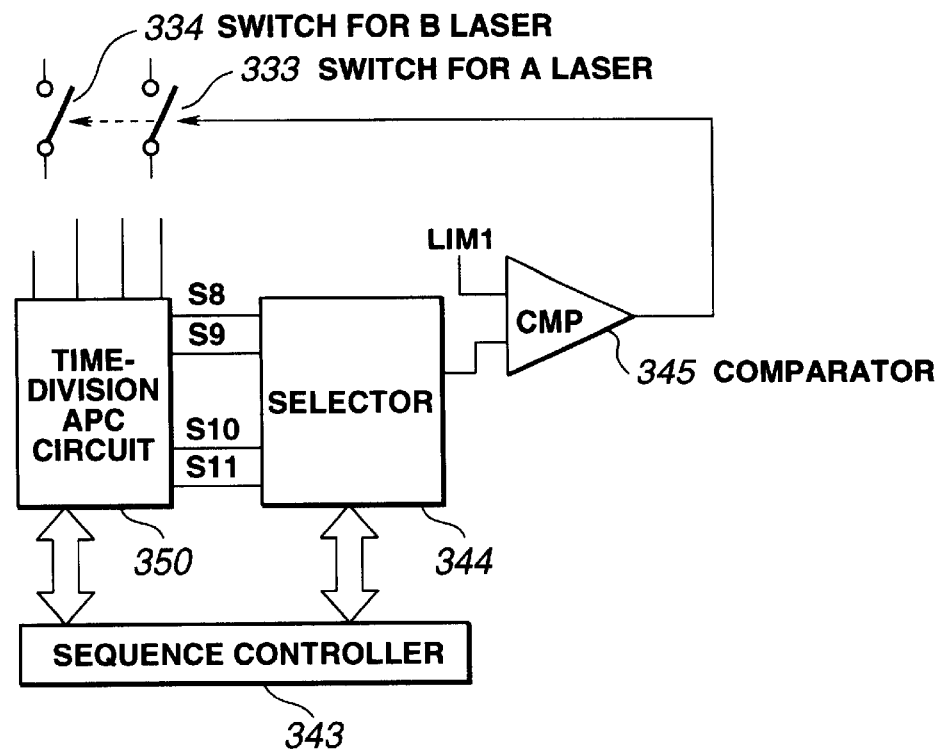
FIG. 9 is a block diagram illustrating the configuration of a portion including a laser driving circuit and a protection circuit according to a third embodiment of the present invention.

Next, a third embodiment of the present invention will be described with reference to FIG. 9. FIG. 9 is a block diagram illustrating the configuration of a portion including a laser driving circuit and a protection circuit according to the third embodiment. In FIG. 9, there are shown a switch 333 for an A laser, a switch 334 for a B laser, a sequence controller 343, a selector 344, a comparator 345, and a time-division APC circuit 350.

In the third embodiment, only portions different from the second embodiment will be described. In the third embodiment, the second comparator 246 in the second embodiment is not used. Instead, the output signal of the selector 344 having a configuration of 4 inputs/1 output is compared with the limiting value LIM1, and the switch 333 for the A laser and the switch 334 for the B laser are interrupted in accordance with the result of the comparison.

Figure 10:
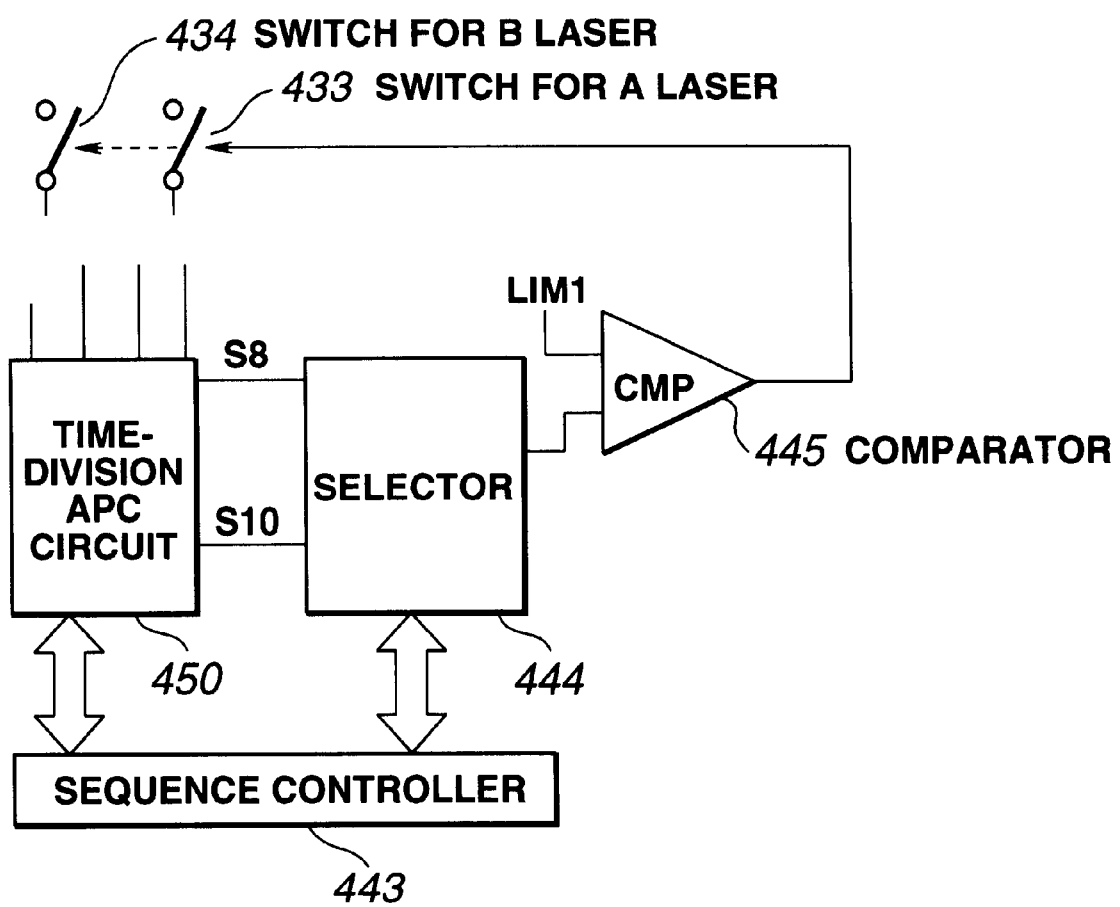
FIG. 10 is a block diagram illustrating the configuration a portion including a laser driving circuit and a protection circuit according to a fourth embodiment of the present invention.

Next, a fourth embodiment of the present invention will be described with reference to FIG. 10. FIG. 10 is a block diagram illustrating the configuration of a portion including a laser driving circuit and a protection circuit according to the fourth embodiment. In FIG. 10, there are shown a switch 433 for an A laser, a switch 434 for a B laser, a sequence controller 443, a selector 444, a comparator 445, and a time-division APC circuit 450.

In the fourth embodiment, only portions different from the third embodiment will be described. In the third embodiment, the four VSH signals S8–S11 from the time-division APC circuit 350 are input to the selector 344. In the fourth embodiment, however, only two signals (S8 and S10 shown in FIG. 7) output during full lighting from among the VSH signals output from the time-division APC circuit 450 are input to the selector 444 having a configuration of 2 inputs/1 output. The output signal of the selector 444 is compared with the limiting value LIM1, and the switches 133 and 134 are disconnected in accordance with the result of the comparison.

As described above, according to the present invention, in the image forming apparatus using a twin-beam laser or a multibeam laser, it is possible to detect the amount of light of each laser during time-division control, to interrupt or limit the driving current for each laser when the amount of light exceeds the limiting value, and therefore to assuredly prevent degradation or destruction of each laser.

Furthermore, by also detecting the amount of light during bias lighting, it is possible to prevent a fog due to an abnormal increase in the bias current caused by temperature rise or the like, and utilize features of a multilaser, such as high-speed and high-definition printing while maintaining a high-quality image.

The individual components shown in outline or designated by blocks in the drawings are all well known in the image forming apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:
   a plurality of laser light sources;
   light detection means for detecting optical outputs of the plurality of laser light sources, said light detection means including at least one sensor unit, wherein the number of the sensor units is smaller than the number of the plurality of laser light sources;
   light-amount control means for receiving signals indicative of the detected optical outputs of the plurality of laser light sources, and based on the received signals outputting (i) a control signal for controlling the optical outputs of each of the plurality of laser light sources to a constant amount of light by performing time-division processing and (ii) a time-division detection signal;
   limiting-value setting means for setting a limiting value for each optical output;
   comparison means for comparing the time-division detection signal for a laser beam detected by said light detection means with the limiting value set by said limiting-value setting means during the time-division light-amount control by said light-amount control means;
   emission control means for controlling emission of the plurality of laser light sources in accordance with an out-put signal from said comparison means; and
   a recording medium on which an image is formed by the plurality of laser beams.

2. An image forming apparatus according to claim 1, further comprising:
   warning means for generating a warning signal in accordance with the output signal from said comparison means.

3. An image forming apparatus according to claim 1, wherein the detection signal for the laser beam detected by said light detection means during the time-division light-amount control by said light-amount control means comprises a detection signal for an optical output during a full lighting period.

4. An image forming apparatus according to claim 1, wherein said light-amount control means comprises a pulse current source subjected to on/off control by pulse-generation control means, and a bias current source whose output is applied to the plurality of laser light sources in parallel with said pulse current source and is adjustable in accordance with the control signal.

5. An image forming apparatus according to claim 4, wherein said bias current source comprises a first bias current source and a second bias current source.

6. An image forming apparatus according to claim 5, wherein said second bias current source is subjected to on/off control by said pulse-generation control means.

7. An image forming apparatus comprising:
   a plurality of laser light sources;
   light detection means for detecting optical outputs of the plurality of laser light sources, said light detection means including at least one sensor unit, wherein the number of the sensor units is smaller than the number of the plurality of laser light sources;
   light-amount control means for receiving signals indicative of the detected optical outputs of the plurality of laser light sources, and based on the received signals outputting (i) a control signal for controlling the optical outputs of each of the plurality of laser light sources to a constant amount of light by performing time-division processing and (ii) time-division detection signals;
   first limiting-value setting means for setting a first limiting value for an optical output of a laser beam;
   second limiting-value setting means for setting a second limiting value for an optical output of a laser beam;

first comparison means for comparing a first of the detection signals for a laser beam detected by said light detection means with the first limiting value set by said first limiting-value setting means during the time-division light-amount control by said light-amount control means;

second comparison means for comparing a second of the detection signals for a laser beam detected by said light detection means with the second limiting value set by said second limiting-value setting means during the time-division light-amount control by said light-amount control means;

emission control means for controlling emission of the plurality of laser light sources in accordance with output signals from said first comparison means and said second comparison means; and a recording medium on which an image is formed by the plurality of laser beams.

8. An image forming apparatus according to claim 7, wherein the first detection signal for the laser beam detected by said light detection means comprises a detection signal for an optical output during a full lighting period, and wherein the second detection signal for the laser beam detected by said light detection means comprises a detection signal for an optical output during a bias lighting period.

9. An image forming apparatus according to claim 7, further comprising:
warning means for generating a warning signal in accordance with output signals from said first comparison means and said second comparison means.

10. An image forming apparatus according to claim 7, wherein said emission control means interrupts emission of at least one laser light source from among the plurality of laser light sources in accordance with an output signal from comparison means selected from said first comparison means and said second comparison means.

11. An image forming apparatus according to claim 10, wherein said emission control means interrupts emission of at least one laser light source from among the plurality of laser light sources in accordance with an output from said first comparison means.

12. An image forming apparatus according to claim 7, wherein said light-amount control means comprises a pulse current source subjected to on/off control by pulse-generation control means, and a bias current source whose output is applied to the plurality of laser light sources in parallel with said pulse current source and is adjustable in accordance with the control signal.

13. An image forming apparatus according to claim 12, wherein said bias current source comprises a first bias current source and a second bias current source.

14. An image forming apparatus according to claim 13, wherein said second bias current source is subjected to on/off control by said pulse-generation control means.

15. A laser driving circuit comprising:
a plurality of laser light sources;
light detection means for detecting optical outputs of the plurality of laser light sources, said light detection means including at least one sensor unit, wherein the number of the sensor units is smaller than the number of the plurality of laser light sources;
light-amount control means for receiving signals indicative of the detected optical outputs of the plurality of laser light sources, and based on the received signals outputting (i) a control signal for controlling the optical outputs of each of the plurality of laser light sources to a constant amount of light by performing time-division processing and (ii) a time-division detection signal:
limiting-value setting means for setting a limiting value for each optical output;
comparison means for comparing the time-division detection signal for a laser beam detected by said light detection means with the limiting value set by said limiting-value setting means during the time-division light-amount control by said light-amount control means; and
emission control means for controlling emission of the plurality of laser light sources in accordance with an output signal from said comparison means.

16. A laser driving circuit according to claim 15, further comprising:
warning means for generating a warning signal in accordance with the output signal from said comparison means.

17. A laser driving circuit according to claim 15, wherein the detection signal for the laser beam detected by said light detection means during the time-division light-amount control by said light-amount control means comprises a detection signal for an optical output during a full lighting period.

18. A laser driving circuit according to claim 15, wherein said light-amount control means comprises a pulse current source subjected to on/off control by pulse-generation control means, and a bias current source whose output is applied to the plurality of laser light sources in parallel with said pulse current source and is adjustable in accordance with the control signal.

19. A laser driving circuit according to claim 18, wherein said bias current source comprises a first bias current source and a second bias current source.

20. A laser driving circuit according to claim 19, wherein said second bias current source is subjected to on/off control by said pulse-generation control means.

21. A laser driving circuit comprising:
a plurality of laser light sources;
light detection means for detecting optical outputs of the plurality of laser light sources, said light detection means including at least one sensor unit, wherein the number of the sensor units is smaller than the number of the plurality of laser light sources;
light-amount control means for receiving signals indicative of the detected optical outputs of the plurality of laser light sources, and based on the received signals outputting (i) a control signal for controlling the optical outputs of each of the plurality of laser light sources to a constant amount of light by performing time-division processing and (ii) time-division detection signals;
first limiting-value setting means for setting a first limiting value for an optical output of a laser beam;
second limiting-value setting means for setting a second limiting value for an optical output of a laser beam;
first comparison means for comparing a first of the detection signals for a laser beam detected by said light detection means with the first limiting value set by said first limiting-value setting means during the time-division light-amount control by said light-amount control means;
second comparison means for comparing a second of the detection signals for a laser beam detected by said light detection means with the second limiting value set by said second limiting-value setting means during the time-division light-amount control by said light-amount control means; and emission control means for controlling emission of the plurality of laser light sources in accordance with output signals from said first comparison means and said second comparison means.

22. A laser driving circuit according to claim 21, wherein the first detection signal for the laser beam detected by said light detection means comprises a detection signal for an optical output during a full lighting period, and wherein the second detection signal for the laser beam detected by said light detection means comprises a detection signal for an optical output during a bias lighting period.

23. A laser driving circuit according to claim 21, further comprising:

warning means for generating a warning signal in accordance with output signals from said first comparison means and said second comparison means.

24. A laser driving circuit according to claim 21, wherein said emission control means interrupts emission of at least one laser light source from among the plurality of laser light sources in accordance with an output signal from comparison means selected from said first comparison means and said second comparison means.

25. A laser driving circuit according to claim 24, wherein said emission control means interrupts emission of at least one laser light source from among the plurality of laser light sources in accordance with an output from said first comparison meads.

26. A laser driving circuit according to claim 21, wherein said light-amount control means comprises a pulse current source subjected to on/off control by pulse-generation control means, and a bias current source whose output is applied to the plurality of laser light sources in parallel with said pulse current source and is adjustable in accordance with the control signal.

27. A laser driving circuit according to claim 26, wherein said bias current source comprises a first bias current source and a second bias current source.

28. A laser driving circuit according to claim 27, wherein said second bias current source is subjected to on/off control by said pulse-generation control means.

29. A method for controlling emission of a plurality of laser light sources, said method comprising the steps of:

setting a limiting value for an optical output of a laser beam;

using at least one sensor unit to detect optical outputs of the plurality of laser light sources, wherein the number of sensor units is less than the number of the plurality of laser light sources;

receiving signals indicative of the detected optical outputs of the plurality of laser light sources, and based on the received signals outputting (i) a control signal for controlling the optical outputs of each of the plurality of laser light sources to a constant amount of light by performing time-division processing and (ii) time-division detection signals;

comparing a first of the time-division detection signals for a first detected laser beam with the limiting value by comparison means during time-division light-amount control for the first laser beam;

comparing a second of the time-division detection signals for a second detected laser beam with the limiting value by the comparison means during time-division light-amount control for the second laser beam; and controlling emission of the first laser light source and the second laser light source in accordance with output signals from the comparison means.

30. An image forming apparatus comprising:

a plurality of laser light sources;

light detection means for detecting optical outputs of the plurality of laser light sources, said light detection means including at least one sensor unit, wherein the number of the sensor units is smaller than the number of the plurality of laser light sources;

light-amount control means for controlling the optical outputs of each of the plurality of laser light sources to a constant amount of light by performing time-division processing;

limiting-value setting means for setting a limiting value for each optical output;

comparison means for comparing a time-division detection signal for a laser beam detected by said light detection means with the limiting value set by said limiting-value setting means during the time-division light-amount control by said light-amount control means with respect to each of said plurality of laser light sources;

emission control means for controlling emission of the plurality of laser light sources in accordance with an output signal from said comparison means; and a recording medium on which an image is formed by the plurality of laser beams.

31. An image forming apparatus according to claim 30, wherein said light-amount control means comprises a pulse current source subjected to on/off control by pulse-generation control means, and a bias current source whose output is applied to the plurality of laser light sources in parallel with said pulse current source and is adjustable in accordance with the control signal.

* * * * *

UNITED STATES PATENT AND TRADEMARK OFFICE
CERTIFICATE OF CORRECTION

PATENT NO.    : 6,266,078 B1
DATED         : July 24, 2001
INVENTOR(S)   : Katsuhide Koga et al.

It is certified that error appears in the above-identified patent and that said Letters Patent is hereby corrected as shown below:

<u>Column 8,</u>
Line 5, "DATAL" should read -- DATA1 --.

<u>Column 15,</u>
Line 27, "meads." should read -- means. --.

Signed and Sealed this

Thirtieth Day of April, 2002

*Attest:*

*Attesting Officer*

JAMES E. ROGAN
*Director of the United States Patent and Trademark Office*